US012785829B2

(12) United States Patent
Wang et al.

(10) Patent No.: US 12,785,829 B2
(45) Date of Patent: Nov. 3, 2026

(54) UPLINK AND DOWNLINK ASYMMETRIC CHANNEL MODEL PARAMETER GENERATING METHOD

(71) Applicant: Southeast University, Nanjing (CN)

(72) Inventors: Chengxiang Wang, Nanjing (CN); Jun Wang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 284 days.

(21) Appl. No.: 18/681,820

(22) PCT Filed: Apr. 11, 2023

(86) PCT No.: PCT/CN2023/087703
§ 371 (c)(1),
(2) Date: Feb. 6, 2024

(87) PCT Pub. No.: WO2023/169596
PCT Pub. Date: Sep. 14, 2023

(65) Prior Publication Data
US 2024/0340097 A1 Oct. 10, 2024

(30) Foreign Application Priority Data
Mar. 7, 2022 (CN) ......................... 202210214614.4

(51) Int. Cl.
*H04B 17/391* (2015.01)

(52) U.S. Cl.
CPC .................................. *H04B 17/391* (2015.01)

(58) Field of Classification Search
CPC .. H04B 17/391; H04B 7/0408; H04B 7/0413; Y02D 30/70

(Continued)

(56) References Cited

U.S. PATENT DOCUMENTS

2017/0019154 A1* 1/2017 Reed .................... H04B 7/0413
2022/0278730 A1* 9/2022 Tsui ....................... G06N 20/00

FOREIGN PATENT DOCUMENTS

CN 113364544 A 9/2021
CN 113992290 A 1/2022
CN 114726464 A 7/2022

OTHER PUBLICATIONS

Wang et al., "6G Asymmetric Channel Modeling and Statistical Properties Analysis", ICC 2022-IEEE International Conference on Communications,Aug. 11, 2022 (Aug. 11, 2022), 6 pages.

(Continued)

*Primary Examiner* — Kwang B Yao
*Assistant Examiner* — Syed M Bokhari
(74) *Attorney, Agent, or Firm* — MUNCY, GEISSLER, OLDS & LOWE, P.C.

(57) ABSTRACT

Disclosed in the present disclosure is an uplink and downlink asymmetric channel model parameter generating method. According to a modeling method, uplink and downlink channel transmission matrices can be generated at the same time when an asymmetric transceiving antenna configuration is used in an uplink and a downlink. In the method, firstly, parameters of a propagation channel between antennas are generated by using a geometric stochastic modeling method according to environmental parameters. Then an antenna pattern is introduced to calculate effective scatterers and corresponding effective paths of the uplink and the downlink. Finally, channel impulse responses of the uplink and the downlink are obtained. The method can be applied to the simulation and optimization of actual asymmetric communication systems.

6 Claims, 2 Drawing Sheets

(58) Field of Classification Search
USPC .......................................................... 370/252
See application file for complete search history.

(56) References Cited

OTHER PUBLICATIONS

Mao et al., "Machine Learning-Based 3D Channel Modeling for U2V mmWave Communications", IEEE Transactions on Antennas & Propagation,Sep. 5, 2021 (Sep. 5, 2021), 15 pages.

* cited by examiner

UPLINK AND DOWNLINK ASYMMETRIC CHANNEL MODEL PARAMETER GENERATING METHOD

TECHNICAL FIELD

The present disclosure relates to the technical field of channel modeling, especially to a method for generating parameters of an uplink and downlink asymmetric channel model.

BACKGROUND

At present, the massive multiple-input multiple-output (MIMO) system at millimeter wave band mainly includes mixed multi-beam array and all-digital multi-beam array. The multi-beam transmitting arrays and receiving arrays are designed symmetrically in the system, that is, the number of transmitting channels and receiving channels is the same. The millimeter wave mixing/all-digital multi-beam receiving and transmitting architecture based on the symmetrical design is adopted at the base station side to generate transmit/receive multi-beams with the same gain. Similarly, the design on the terminal side is similar to that on the base station side, except that the scale of array is smaller.

The basic principle of the asymmetric millimeter wave massive MIMO system is that the all-digital multi-beam transmitting array and receiving array are designed asymmetrically, that is, the scales of the transmitting array and the receiving array are different. A larger scale all-digital multi-beam transmitting array and a smaller scale all-digital multi-beam receiving array are adopted at the base station side, then a narrower transmitting multi-beam and a wider receiving multi-beam can be generated. The traditional symmetric form can still be maintained at the terminal side, or an asymmetric form can be adopted.

In asymmetric communication system, it is extremely important to establish an accurate channel model of the asymmetric uplink and downlink. At present, the channel models are mainly generated for a single link, and cannot accurately describe the related channel characteristics between the uplink and the downlink. Therefore, it is necessary to establish a channel model of the asymmetric uplink and downlink accurately.

SUMMARY

The objectives of the present disclosure are to provide a method for generating parameters of the uplink and downlink asymmetric channel model, so as to solve the technical problems that the existing channel models are mainly generated for a single link, but cannot accurately describe the related channel characteristics between the uplink and the downlink.

In order to solve the above technical problems, the technical solutions provided in the present disclosure are specifically as follows.

Provided is a method of generating parameters for the uplink and downlink asymmetric channel model. The method includes the following steps.

In Step 1, a primary antenna configuration of the uplink and downlink is determined, which includes a number of elements, array forms and sub-array arrangements in antenna arrays. Then a three-dimensional pattern of sub-array antennas of the transceiving antennas and transmitting powers of the uplink and downlink is calculated.

In Step 2, a scattering distribution between antennas of the downlink is generated which includes a number of scatterer clusters, as well as path powers, delays and angles of clusters and rays.

In Step 3, uplink channel parameters are calculated according to parameters of the downlink with a process of coordinate transformations. Transceiving angles of paths of the uplink are also calculated.

In Step 4, effective scatterers and effective paths of the uplink and downlink are generated according to the three-dimensional pattern of the sub-array antennas of the transceiving antennas in Step 1, path parameters of the downlink in Step 2, and path parameters of the uplink in Step 3.

In Step 5, eventual channel impulse responses of the uplink and downlink channels are calculated and obtained.

Further, Step 1 specifically includes following steps.

A total number of antennas at the primary side of the uplink and downlink is obtained; all antennas are composed of sub-array arrangements, a total number of sub-arrays at a transmitting side is P, a total number of sub-arrays at a receiving side is Q, and a formula for calculating the three-dimensional direction of the sub-array antennas is:

$$F(\phi,\theta)=R(\phi,\theta)A(\phi,\theta),$$

where $R(\phi,\theta)$ denotes a pattern of antenna elements, $A(\phi,\theta)$ denotes an array factor, $\phi$ and $\theta$ denote elevation angle and azimuth angle, respectively, a formula for calculating the array factor in planar array is:

$$A(\phi,\theta)=\frac{1}{\sqrt{KL}}\sum_{k=1}^{K}\sum_{l=1}^{L}\exp\{j(a_x+k-1)\Psi_x(\phi,\theta)+j(a_y+l-1)\Psi_y(\phi,\theta)-j\Psi_{k,l}\},$$

where K and L denote a number of elements for the antenna arrays in an x direction and a y direction respectively;

$$\Psi_x(\phi,\theta)=\frac{2\pi}{\lambda}d_x\cos(\phi)\sin(\theta),\ \Psi_y(\phi,\theta)=\frac{2\pi}{\lambda}d_y\sin(\phi)\sin(\theta),$$

$d_x$ denotes a distance between elements in the X direction, $d_y$ denotes a distance between elements in the Y direction, $a_x$ denotes a reference position of the sub-array in the x direction of an entire array, $a_y$ denotes a reference position of the sub-array in the y direction of the entire array, j denotes an imaginary element.

A superscript U is added to all parameters of the uplink channel, a superscript D is added to all parameters of the downlink channel; a superscript T is added to all parameters of the transmitting side, a superscript R is added to all parameters of the receiving side, the antenna pattern at the receiving side in the downlink is denoted as $F^{D,R}(\phi,\theta)$ an antenna pattern at the transmitting side in the downlink is denoted as $F^{D,T}(\phi,\theta)$, an antenna pattern at the receiving side in the uplink is denoted as $F^{U,R}(\phi,\theta)$. The antenna pattern at the transmitting side in the uplink is denoted as $F^{U,T}(\phi,\theta)$.

Further, Step 2 specifically includes following steps.

In Step 201, channel parameters of a p-th transmitting sub-array and a q-th receiving sub-array at an initial time are calculated by considering the downlink. A linear distance is denoted as $D_{pq}$, an initial rice factor is denoted as $K_{R0}$.

For a line-of-sight (LoS) path, an elevation angle of a departure angle is denoted as $$\phi_L^{D,T},$$

an elevation angle of an arrival angle is denoted as $$\phi_L^{D,R},$$

an azimuth angle of the departure angle is denoted as $$\theta_L^{D,T},$$

and an azimuth angle of the arrival angle is denoted as $$\theta_L^{D,R}.$$

In Step 202, for a non-line-of-sight (NLoS) path, the number of clusters is denoted as N. The total number of paths in a n-th cluster is denoted as $M_n$. The arrival angles and departure angles of the N clusters are generated according to Von Mises distribution for the n-th cluster, an elevation angle of a departure angle is denoted as $$\phi_n^{D,T},$$

an elevation angle of an arrival angle is denoted as $$\phi_n^{D,R},$$

an azimuth angle of the departure angle is denoted as $$\theta_n^{D,T},$$

and an azimuth angle of the arrival angle is denoted as $$\theta_n^{D,R}.$$

Then sub-paths within each cluster are generated randomly, and angles of the sub-paths follows a Gaussian distribution. The delay of an m-th path in the n-th cluster between the p-th transmitting sub-array and the q-th receiving sub-array is denoted as $$\tau_{pq,m_n}^D,$$

$$\tau_{pq,m_n}^D = d_{pq,m_n}^D + \tilde{\tau}_{pq,m_n},$$

where the superscript D denotes the downlink, $$d_{pq,m_n}^D$$

denotes a distance between the p-th transmitting sub-array and the q-th receiving sub-array, $\tilde{\tau}_{pq,m_n}$ denotes a time delay between a first scatterer and a last scatterer whose calculation formula is $\tilde{\tau}_{pq,m_n}=\tilde{d}_{pq,m_n}/c+\tau_{C,link}$, where c denotes a speed of light, $\tilde{d}_{pq,m_n}$ denotes a direct distance between the first scatterer and the last scatterer, and $\tau_{C,link}$ denotes a random variable that follows an exponential distribution.

A formula for calculating a power $$P_{pq,m_n}^D$$

of each path is as follows:

$$P_{pq,m_n}^D = \exp\left(-\tau_{pq,m_n}^D \frac{r_\tau - 1}{r_\tau DS}\right) \cdot 10^{\frac{-z_n}{10}} \zeta_n(p, q),$$

where $z_n$ denotes a shadowing of the n-th cluster, DS denotes a time delay expansion of a root-mean-square, and $r_\tau$ denotes a scale factor of a time delay distribution that is determined by a ratio of a standard deviation of the time delay to the time delay expansion of the root-mean-square; $\zeta_n$(p,q) denotes a lognormal process in a two-dimensional space; if paths in the clusters are not distinguishable, the time delay in the above formula is replaced with $$\tau_{pq,n}^D$$

and calculated by utilizing a following formula:

$$P_{pq,m_n}^D = \frac{1}{M_n} \exp\left(-\tau_{pq,n}^D \frac{r_\tau - 1}{r_\tau DS}\right) \cdot 10^{\frac{-z_n}{10}} \zeta_n(p, q).$$

Further, Step 3 specifically includes following steps.

According to a reversible principle, when an asymmetric antenna configuration is not considered, paths of the uplink and downlink are symmetrical, and the receiving side and the transmitting side are exchanged with each other, therefore, a number of clusters and a number of sub-paths generated in the downlink remain unchanged, powers remain unchanged, and the angles need to be transformed accordingly, for the LoS path, a receiving elevation angle $$\phi_L^{U,R},$$

a transmitting elevation angle $$\phi_L^{U,T},$$

a receiving azimuth angle $$\theta_L^{U,T},$$

and a transmitting azimuth angle $$\theta_L^{U,T}$$

of the uplink, are calculated by the following formulas specifically:

for the LoS path, $$\phi_L^{U,R} = \pi - \phi_L^{D,T},$$

$$\phi_L^{U,T} = \pi - \phi_L^{D,R},$$

$$\theta_L^{U,R} = \pi - \theta_L^{D,T},$$

$$\theta_L^{U,T} = \pi - \theta_L^{D,R},$$

where for the m-th path within the n-th cluster of the non-LoS paths, a receiving elevation angle $$\phi_{pq,m_n}^{U,R},$$

a transmitting elevation angle $$\phi_{pq,m_n}^{U,T},$$

a receiving azimuth angle $$\theta_{pq,m_n}^{U,R},$$

and a transmitting azimuth $$\theta_{pq,m_n}^{U,T}$$

of the uplink, are calculated by the following formula specifically:

$$\phi_{pq,m_n}^{U,R} = \pi - \phi_{pq,m_n}^{D,T},$$

$$\phi_{pq,m_n}^{U,T} = \pi - \phi_{pq,m_n}^{D,R},$$

$$\theta_{pq,m_n}^{U,R} = \pi - \theta_{pq,m_n}^{D,T},$$

$$\theta_{pq,m_n}^{U,T} = \pi - \theta_{pq,m_n}^{D,R}.$$

Further, Step 4 specifically includes following steps.

In Step 401, a total power $$P_{pq,m_n}^{D}$$

of the m-th path within the n-th cluster of the downlink is calculated by considering the antenna patterns of the transmitting side and the receiving side of the uplink and downlink, and a calculation formula is as follows:

$$P_{pq,m_n}^{D} = \tilde{P}_{pq,m_n}^{D} F^{D,T}(\phi_{pq,m_n}^{D,T}, \theta_{pq,m_n}^{D,T}) F^{D,R}(\phi_{pq,m_n}^{D,R}, \theta_{pq,m_n}^{D,R}),$$

a formula for calculating a total power $$P_{pq,m_n}^{U}$$

of the m-th path within the n-th cluster of the uplink is as follows:

$$P_{pq,m_n}^{U} = P_{pq,m_n}^{U} F^{U,T}(\phi_{pq,m_n}^{U,T}, \theta_{pq,m_n}^{U,T}) F^{U,R}(\phi_{pq,m_n}^{U,R}, \theta_{pq,m_n}^{U,R}),$$

a formula for calculating a total power $$P_{pq,n}^{D}$$

of each cluster of the downlink is as follows:

$$P_{pq,n}^{D} = \left\| \sum_{m=1}^{M_n} P_{pq,m_n}^{D} \exp(-j2\pi f \tau_{pq,m_n}^{D}) \right\|,$$

a formula for calculating a total power $$P_{pq,m_n}^{U}$$

of each cluster of the uplink is as follows:

$$P_{pq,n}^{U} = \left\| \sum_{m=1}^{M_n} P_{pq,m_n}^{U} \exp(-j2\pi f \tau_{pq,m_n}^{U}) \right\|,$$

Calculated cluster powers are compared with an average noise power, clusters with cluster powers greater than the average noise power are considered as effective clusters, and clusters with cluster powers less than the average noise power are ignored, to obtain an eventual set of all of the effective clusters.

Further, eventual channel impulse responses of the downlink in Step 5 are calculated and obtained as follows:

$$H_{p,q}^{D} = \sum_{n=1}^{N} \sum_{m=1}^{M_n} P_{pq,m_n}^{D} \exp(-j2\pi f \tau_{pq,m_n}^{D}) \delta(\tau - \tau_{pq,m_n}^{D}),$$

the channel impulse response of the uplink are as follows:

$$H_{p,q}^{U}=\sum_{n=1}^{N}\sum_{m=1}^{M_n}P_{pq,m_n}^{U}\exp\left(-j2\pi f\tau_{pq,m_n}^{U}\right)\delta\left(\tau-\tau_{pq,m_n}^{U}\right).$$

The method for generating parameters of the uplink and downlink asymmetric channel model provided in the present disclosure has the following advantages.

The present disclosure is capable of establishing a geometric random channel model of the asymmetric communication, and generating an accurate channel model by establishing the channel parameters related to the downlink at the same time, which is suitable for analyzing and describing the situations of the uplink and downlink of the asymmetric communication.

DETAILED DESCRIPTION OF THE EMBODIMENTS

In order to understand the objectives, structures and functions of the present disclosure better, a method for generating parameters of an uplink and downlink asymmetric channel model provided in the present disclosure is further elucidated in detail in conjunction with the drawings.

Embodiment 1

Figure 1:
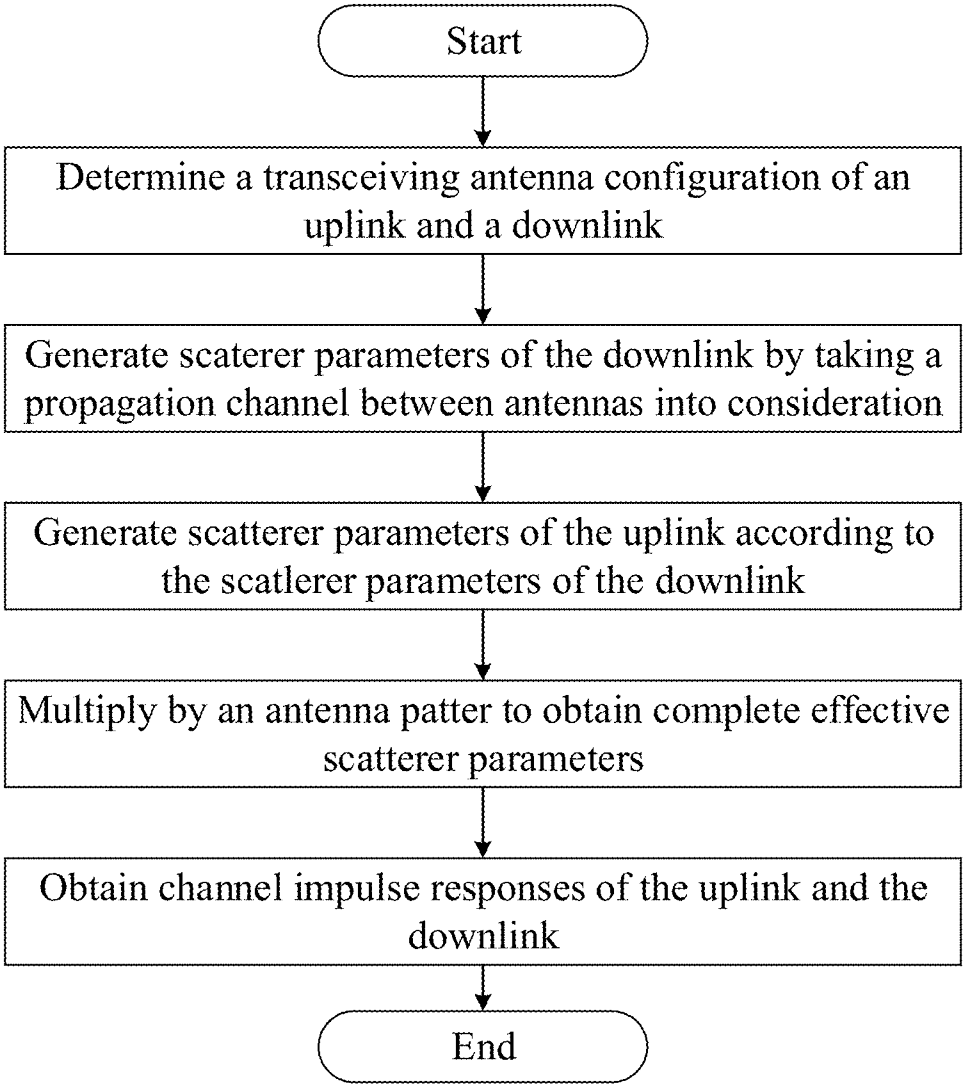
FIG. 1 illustrates a flow diagram of a method for generating parameters of an uplink and downlink asymmetric channel model in Embodiment 1 of the present disclosure.
Figure 2:
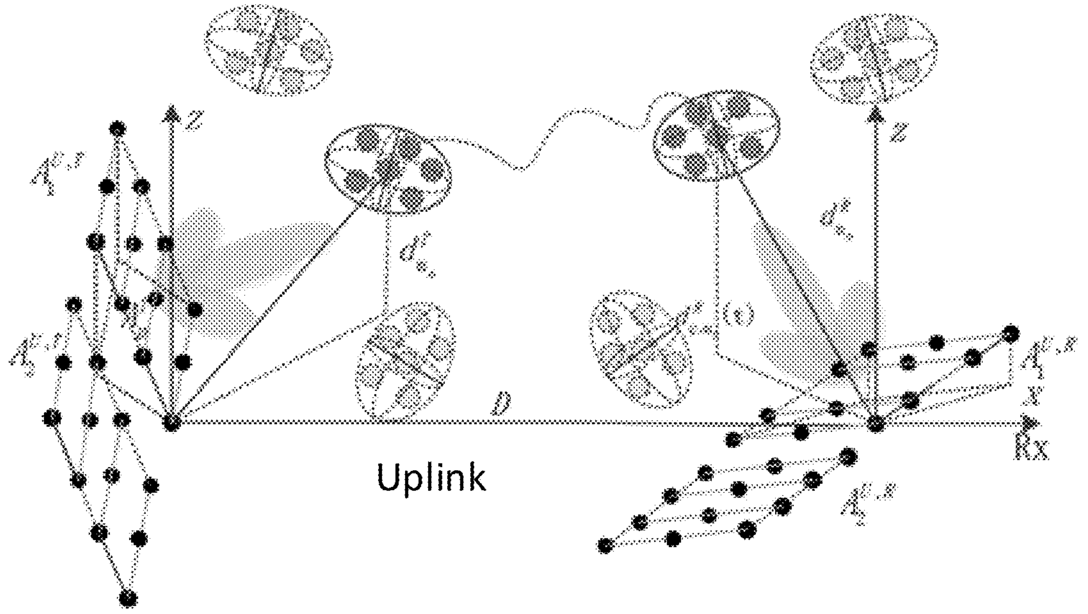
FIG. 2 illustrates a schematic diagram of the uplink in the channel model in Embodiment 1 of the present disclosure.
Figure 3:
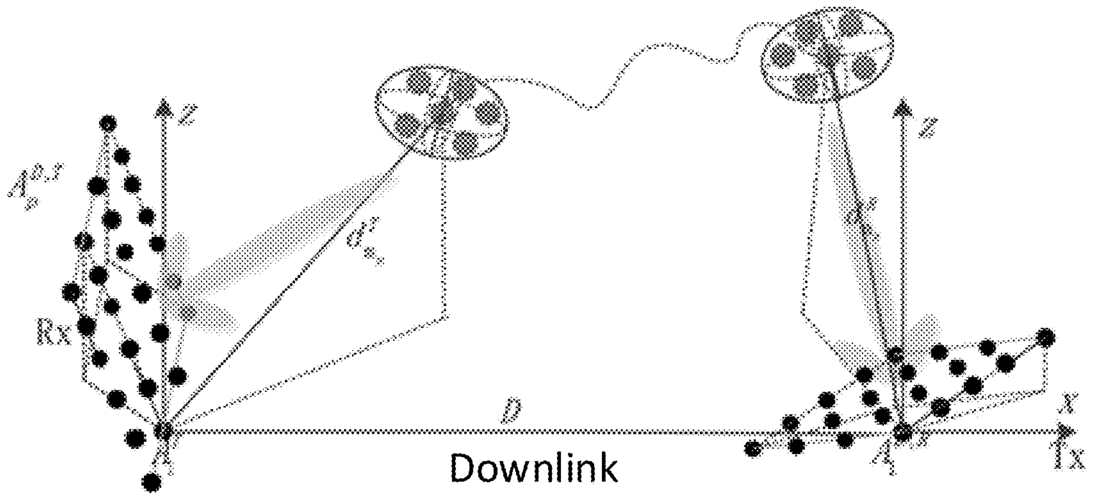
FIG. 3 illustrates a schematic diagram of the downlink in the channel model in Embodiment 1 of the present disclosure.

As illustrated in FIG. 1, the present disclosure provides a method for generating parameters of an uplink and downlink asymmetric channel model. The schematic diagrams of the model are as illustrated in FIG. 2 and FIG. 3. The method includes the following steps.

In Step 1, a primary antenna configuration of the uplink and downlink is determined, which includes a number of elements, array forms and sub-array arrangements of antenna arrays, then a three-dimensional pattern of sub-array antennas of the transceiving antennas and transmitting powers of the uplink and downlink is calculated by utilizing a formula.

A total number of antennas at the primary side of the uplink and downlink is obtained; all antennas are composed of sub-array arrangements, a total number of sub-arrays at a transmitting side and at a receiving side are P and Q, respectively, and a formula for calculating the antenna pattern is:

$$F(\phi,\theta)=R(\phi,\theta)A(\phi,\theta),$$

where $R(\phi,\theta)$ denotes a pattern of antenna elements, $A(\phi,\theta)$ denotes an array factor, $\phi$ and $\theta$ denote elevation angle and azimuth angle respectively, a formula for calculating the array factor of planar array is:

$$A(\phi,\theta)=\frac{1}{\sqrt{KL}}\sum_{k=1}^{K}\sum_{l=1}^{L}\exp\{j(a_x+k-1)\Psi_x(\phi,\theta)+j(a_y+l-1)\Psi_y(\phi,\theta)-j\Psi_{k,l}\},$$

where K and L denote a number of elements for antenna arrays in an x direction and a y direction respectively;

$$\Psi_x(\phi,\theta)=\frac{2\pi}{\lambda}d_x\cos(\phi)\sin(\theta),\ \Psi_y(\phi,\theta)=\frac{2\pi}{\lambda}d_y\sin(\phi)\sin(\theta),$$

$d_x$ denotes a distance between elements in the x direction, $d_y$ denotes a distance between elements in the y direction, $a_x$ and $a_y$ denote a reference position of the sub-array in the x direction of an entire array and a reference position of the sub-array in the y direction of the entire array, respectively.

A superscript U is added to all parameters of the uplink channel, a superscript D is added to all parameters of the downlink channel; a superscript T is added to all parameters of the transmitting side, a superscript R is added to all parameters of the receiving side, to obtain an antenna pattern at the receiving side in the downlink which is denoted as $F^{D,R}(\phi,\theta)$, an antenna pattern at the transmitting side in the downlink which is denoted as $F^{D,T}(\phi,\theta)$, an antenna pattern at the receiving side in the uplink which is denoted as $F^{U,R}(\phi,\theta)$, and an antenna pattern at the transmitting side in the uplink which is denoted as $F^{U,T}(\phi,\theta)$.

In Step 2, a scattering distribution between antennas of the downlink is generated which includes a number of scatterer clusters, as well as path powers, time delays and transceiving angle parameters of clusters and sub-paths.

In Step 201, channel parameters of a p-th transmitting sub-array and a q-th receiving sub-array at an initial time instant are calculated by considering the downlink, a linear distance is denoted as $D_{pq}$, an initial rice factor is denoted as $K_{R0}$. For the LoS path, an elevation angle of a departure angle is denoted as $$\phi_L^{D,T},$$

an elevation angle of an arrival angle is denoted as $$\phi_L^{D,R},$$

an azimuth angle of the departure angle is denoted as $$\theta_L^{D,T},$$

and an azimuth angle of the arrival angle is denoted as $$\theta_L^{D,R}.$$

In Step 202, for a NLoS path, a number of clusters which is denoted as N and a total number of paths in a n-th cluster which is denoted as $M_n$ are firstly generated, arrival angles and departure angles of the N clusters are generated according to Von Mises distribution, for the n-th cluster, an elevation angle of a departure angle is denoted as $$\phi_n^{D,T},$$

an elevation angle of an arrival angle is denoted as $$\phi_n^{D,R},$$

an azimuth angle of the departure angle is denoted as $$\phi_n^{D,T},$$

and an azimuth angle of the arrival angle is denoted as $$\theta_n^{D,R}.$$

Then sub-paths within each cluster are generated randomly, and angles of the sub-paths follows a Gaussian distribution; a time delay of an m-th path in the n-th cluster between the p-th transmitting sub-array and the q-th receiving sub-array is denoted as $$\tau_{pq,m_n}^D = d_{pq,m_n}^D + \tilde{\tau}_{pq,m_n},$$

the superscript D denotes the downlink, $$d_{pq,m_n}^D$$

denotes a distance between the p-th transmitting sub-array and the q-th receiving sub-array, $\tilde{\tau}_{pq,m_n}$ denotes a time delay between a first scatterer and a last scatterer whose calculation formula is $\tilde{\tau}_{pq,m_n}=\tilde{d}_{pq,m_n}/c\pm\tau_{C,link}$, c denotes a speed of light, $\tilde{d}_{pq,m_n}$ denotes a direct distance between the first scatterer and the last scatterer, and $\tau_{C,link}$ denotes a random variable that follows an exponential distribution.

A formula for calculating a power $$P_{pq,m_n}^D$$

of each path is as follows:

$$P_{pq,m_n}^D = \exp\left(-\tau_{pq,m_n}^D \frac{r_\tau - 1}{r_\tau DS}\right) \cdot 10^{\frac{-z_n}{10}} \zeta_n(p, q),$$

where $z_n$ denotes a shadowing of the n-th cluster, DS denotes a time delay expansion of a root-mean-square, and $r_\tau$ denotes a scale factor of a time delay distribution that is determined by a ratio of a standard deviation of the time delay to the time delay expansion of the root-mean-square; $\zeta_n$(p,q) denotes a lognormal process in a two-dimension space; if paths in the clusters are not distinguishable, the time delay in the above formula is replaced with $$\tau_{pq,n}^D$$

and calculated by utilizing a following formula:

$$P_{pq,m_n}^D = \frac{1}{M_n} \exp\left(-\tau_{pq,n}^D \frac{r_\tau - 1}{r_\tau DS}\right) \cdot 10^{\frac{-z_n}{10}} \zeta_n(p, q).$$

In Step 3, parameters of the uplink are calculated according to the parameters of the downlink with a process of coordinate transformations, and transceiving angles of paths of the uplink are calculated.

According to a reversible principle, when an asymmetric antenna configuration is not considered, paths of the uplink and downlink are symmetrical, and the receiving side and the transmitting side are exchanged with each other, therefore, a number of clusters and a number of sub-paths generated in the downlink remain unchanged, powers remain unchanged, and the angles need to be transformed accordingly, for the LoS path, a receiving elevation angle $$\phi_L^{U,R},$$

a transmitting elevation angle $$\phi_L^{U,T},$$

a receiving azimuth angle $$\theta_L^{U,R},$$

and a transmitting azimuth angle $$\theta_L^{U,T}$$

of the uplink, are calculated by the following formulas specifically:

for the LoS path, $$\phi_L^{U,R} = \pi - \phi_L^{D,T},$$
$$\phi_L^{U,T} = \pi - \phi_L^{D,R},$$
$$\theta_L^{U,R} = \pi - \theta_L^{D,T},$$
$$\theta_L^{U,T} = \pi - \theta_L^{D,R},$$

where for the m-th path within the n-th cluster of the NLoS path, a receiving elevation angle $$\phi_{pq,m_n}^{U,R},$$

a transmitting elevation angle $$\phi^{U,T}_{pq,m_n},$$

a receiving azimuth angle $$\theta^{U,R}_{pq,m_n},$$

and a transmitting azimuth angle $$\theta^{U,T}_{pq,m_n}$$

of the uplink, are calculated by the following formulas specifically:
for the LoS path, $$\phi^{U,R}_{pq,m_n} = \pi - \phi^{D,T}_{pq,m_n},$$
$$\phi^{U,T}_{pq,m_n} = \pi - \phi^{D,R}_{pq,m_n},$$
$$\theta^{U,R}_{pq,m_n} = \pi - \theta^{D,T}_{pq,m_n},$$
$$\theta^{U,T}_{pq,m_n} = \pi - \theta^{D,R}_{pq,m_n}.$$

In Step 4, the effective scatterers and the effective paths are generated according to the patterns of the transceiving antennas of the uplink and downlink, the scatterers in Step 2, and the path parameters in Step 3.

In Step 401, a total power $$P^D_{pq,m_n}$$

of the m-th path within the n-th cluster of the downlink is calculated by considering the antenna patterns of the transmitting side and the receiving side of the uplink and downlink and a calculation formula is as follows:

$$P^D_{pq,m_n} = \tilde{P}^D_{pq,m_n} F^{D,T}\left(\phi^{D,T}_{pq,m_n}, \theta^{D,T}_{pq,m_n}\right) F^{D,R}\left(\phi^{D,R}_{pq,m_n}, \theta^{D,R}_{pq,m_n}\right),$$

a formula for calculating a total power $$P^U_{pq,m_n}$$

of the m-th path within the n-th cluster of the uplink is as follows:

$$P^U_{pq,m_n} = P^U_{pq,m_n} F^{U,T}\left(\phi^{U,T}_{pq,m_n}, \theta^{U,T}_{pq,m_n}\right) F^{U,R}\left(\phi^{U,R}_{pq,m_n}, \theta^{U,R}_{pq,m_n}\right),$$

a formula for calculating a total power $$P^D_{pq,n}$$

of each cluster of the downlink is as follows:

$$P^D_{pq,n} = \left\| \sum_{m=1}^{M_n} P^D_{pq,m_n} \exp\left(-j2\pi f \tau^D_{pq,m_n}\right) \right\|.$$

a formula for calculating a total power $$P^U_{pq,n}$$

of each cluster of the uplink is as follows:

$$P^U_{pq,n} = \left\| \sum_{m=1}^{M_n} P^U_{pq,m_n} \exp\left(-j2\pi f \tau^U_{pq,m_n}\right) \right\|.$$

Calculated cluster powers are compared with an average noise power, clusters with cluster powers greater than the average noise power are effective clusters, and clusters with cluster powers less than the average noise power are ignored, to obtain an eventual set of all of the effective clusters.

In Step 5, eventual channel impulse responses $$H^D_{p,q}$$

of the uplink and downlink are calculated and obtained as follows:

$$H^D_{p,q} = \sum_{n=1}^{N} \sum_{m=1}^{M_n} P^D_{pq,m_n} \exp\left(-j2\pi f \tau^D_{pq,m_n}\right) \delta\left(\tau - \tau^D_{pq,m_n}\right),$$

the channel impulse response of the uplink are as follows:

$$H^U_{p,q} = \sum_{n=1}^{N} \sum_{m=1}^{M_n} P^U_{pq,m_n} \exp\left(-j2\pi f \tau^U_{pq,m_n}\right) \delta\left(\tau - \tau^U_{pq,m_n}\right).$$

It should be understood that the present disclosure is described with some embodiments, it is well-known to those who skilled in the art that the features and embodiments may be modified or equivalent replaced without deviating from the spirit and scope of the present disclosure. In addition, under the teachings of the present disclosure, these features and embodiments may be modified to suit specific situations and materials without deviating from the spirit and scope of the present disclosure. Therefore, the present disclosure is not limited by the specific embodiments disclosed herein, and all embodiments falling within the scope of the claims of the present application fall within the scope protected by the present disclosure.

What is claimed is:

1. A method of generating parameters for an uplink and downlink asymmetric channel model, comprising following steps:

Step 1, determining, a primary antenna configuration of the uplink and downlink, which includes a number of elements, array forms and sub-array arrangements in antenna arrays, then calculating, by utilizing a formula, a three-dimensional pattern of sub-array antennas of transceiving antennas and transmitting powers of the uplink and downlink;

Step 2, generating, a scattering distribution between antennas of the downlink, which includes a number of scatterer clusters, as well as path powers, time delays and transceiving angle parameters of clusters and sub-paths;

Step 3, calculating, according to parameters of the downlink, parameters of the uplink, which mainly includes coordinate transformations, and calculating transceiving angles of paths of the uplink;

Step 4, generating, according to the three-dimensional pattern of the sub-array antennas of the transceiving antennas in Step 1, path parameters of the downlink in Step 2, and path parameters of the uplink in Step 3, effective scatterers and effective paths of the uplink and downlink; and Step 5, calculating and obtaining eventual channel impulse responses of the uplink and downlink, wherein the channel impulse responses of the uplink and downlink are configured to generate the uplink and downlink asymmetric channel model, and the uplink and downlink asymmetric channel model is configured to simulate and optimize an actual asymmetric communication system.

2. The method of generating parameters for the uplink and downlink asymmetric channel model according to claim 1, wherein Step 1 specifically includes following steps:

obtaining a total number of antennas at the primary side of the uplink and downlink; wherein all antennas are composed of sub-array arrangements, a total number of sub-arrays at a transmitting side is P, a total number of sub-arrays at a receiving side is Q, and a formula for calculating a three-dimensional direction of the sub-array antennas is:

$$F(\phi,\theta)=R(\phi,\theta)A(\phi,\theta),$$

where $R(\phi,\theta)$ denotes a pattern of antenna elements, $A(\phi,\theta)$ denotes an array factor, $\phi$ and $\theta$ denote elevation angle and azimuth angle, respectively, a formula for calculating the array factor in a planar array is:

$$A(\phi,\theta)=\frac{1}{\sqrt{KL}}\sum_{k=1}^{K}\sum_{l=1}^{L}\exp\{j(a_x+k-1)\Psi_x(\phi,\theta)+j(a_y+l-1)\Psi_y(\phi,\theta)-j\psi_{k,l}\},$$

where K and L denote a number of elements for the antenna arrays in an x direction and a y direction respectively;

$$\Psi_x(\phi,\theta)=\frac{2\pi}{\lambda}d_x\cos(\phi)\sin(\theta),\ \Psi_y(\phi,\theta)=\frac{2\pi}{\lambda}d_y\sin(\phi)\sin(\theta),$$

$d_x$ denotes a distance between elements in the x direction, $d_y$ denotes a distance between elements in the y direction, $a_x$ denotes a reference position of the sub-array in the x direction of an entire array, $a_y$ denotes a reference position of the sub-array in the y direction of the entire array, j denotes an imaginary element;

a superscript U is added to all parameters of the uplink channel, a superscript D is added to all parameters of the downlink channel, a superscript T and a superscript R are added to all parameters of the transmitting side and receiving side, respectively; an antenna pattern at the receiving side in the downlink is denoted as $F^{D,R}(\phi,\theta)$, an antenna pattern at the transmitting side in the downlink is denoted as $F^{D,T}(\phi,\theta)$, the antenna pattern at the receiving side in the uplink is denoted as $F^{U,R}(\phi,\theta)$, the antenna pattern at the transmitting side in the uplink is denoted as $F^{U,T}(\phi,\theta)$.

3. The method of generating parameters for the uplink and downlink asymmetric channel model according to claim 2, wherein Step 2 specifically includes following steps:

Step 201, calculating, by considering the downlink, channel parameters of a p-th transmitting sub-array and a q-th receiving sub-array at an initial time instant, wherein a linear distance is denoted as $D_{pq}$, an initial rice factor is denoted as $K_{R0}$;

wherein for a LoS path, an elevation angle of a departure angle is denoted as $$\phi_L^{D,T},$$

an elevation angle of an arrival angle is denoted as $$\phi_L^{D,R},$$

an azimuth angle of the departure angle is denoted as $$\theta_L^{D,T},$$

and an azimuth angle of the arrival angle is denoted as $$\theta_L^{D,R};$$

Step 202, for a NLoS path, firstly generating a number of clusters which is denoted as N and a total number of paths in a n-th cluster which is denoted as $M_n$, generating, according to a Von Mises distribution, arrival angles and departure angles of the N clusters, wherein for the n-th cluster, an elevation angle of a departure angle is denoted as $$\phi_n^{D,T},$$

an elevation angle of an arrival angle is denoted as $$\phi_n^{D,R},$$

an azimuth angle of the departure angle is denoted as $$\theta_n^{D,T},$$

and an azimuth angle of the arrival angle is denoted as $$\theta_n^{D,R};$$

then randomly generating sub-paths within each cluster, wherein angles of the sub-paths follows a Gaussian distribution; a time delay of an m-th path in the n-th cluster between the p-th transmitting sub-array and the q-th receiving sub-array is denoted as $$\tau^D_{pq,m_n},$$

where the superscript D denotes the downlink, $$d^D_{pq,m_n}$$

denotes a distance between the p-th transmitting sub-array and the q-th receiving sub-array, $\tilde{\tau}_{pq,m_n}$ denotes a time delay between a first scatterer and a last scatterer whose calculation formula is $\tilde{\tau}_{pq,m_n} \equiv \tilde{d}_{pq,m_n}/c+\tau_{C,link}$, where c denotes a speed of light, $\tilde{d}_{pq,m_n}$ denotes a direct distance between the first scatterer and the last scatterer, and $\tau_{C,link}$ denotes a random variable that follows an exponential distribution;

a formula for calculating a power $$P^D_{pq,m_n}$$

of each path is as follows:

$$P^D_{pq,m_n} = \exp\left(-\tau^D_{pq,m_n}\frac{r_\tau - 1}{r_\tau DS}\right)\cdot 10^{\frac{-z_n}{10}}\zeta_n(p, q),$$

where $z_n$ denotes a shadowing of the n-th cluster, DS denotes a time delay expansion of a root-mean-square, and $r_\tau$ denotes a scale factor of a time delay distribution that is determined by a ratio of a standard deviation of the time delay to the time delay expansion of the root-mean-square; $\theta_n(p,q)$ denotes a lognormal process in a two-dimensional space;

replacing, if paths in the clusters are not distinguishable, the time delay in the above formula with $$\tau^D_{pq,n}$$

and calculating by utilizing a following formula:

$$P^D_{pq,m_n} = \frac{1}{M_n}\exp\left(-\tau^D_{pq,n}\frac{r_\tau - 1}{r_\tau DS}\right)\cdot 10^{\frac{-z_n}{10}}\zeta_n(p, q).$$

4. The method of generating parameters for the uplink and downlink asymmetric channel model according to claim 3, wherein Step 3 specifically includes following steps:

according to a reversible principle, when an asymmetric antenna configuration is not considered, paths of the uplink and downlink are symmetrical, and the receiving side and the transmitting side are exchanged with each other, therefore, a number of clusters and a number of sub-paths generated in the downlink remain unchanged, powers remain unchanged, and the angles need to be transformed accordingly, for the LoS path, a receiving elevation angle $$\phi_L^{U,R},$$

a transmitting elevation angle $$\phi_L^{U,T},$$

a receiving azimuth angle $$\theta_L^{U,R},$$

and a transmitting azimuth angle $$\theta_L^{UI}$$

of the uplink, are calculated by the following formulas specifically:

$$\phi_L^{U,R} = \pi - \phi_L^{D,T},$$
$$\phi_L^{U,T} = \pi - \phi_L^{D,R},$$
$$\theta_L^{U,R} = \pi - \theta_L^{D,T},$$
$$\theta_L^{U,T} = \pi - \theta_L^{D,R},$$

where for the m-th path within the n-th cluster of the NLoS path, a receiving elevation angle $$\theta_L^{U,T}$$

a transmitting elevation angle $$\phi^{U,T}_{pq,m_n}$$

a receiving azimuth angle $$\theta^{U,R}_{pq,m_n},$$

and a transmitting azimuth angle $$\theta^{U,T}_{pq,m_n}$$

of the uplink, are calculated by the following formulas specifically:

$$\phi^{U,R}_{pq,m_n} = \pi - \phi^{D,T}_{pq,m_n},$$

$$\phi^{U,T}_{pq,m_n} = \pi - \phi^{D,R}_{pq,m_n},$$

$$\theta^{U,R}_{pq,m_n} = \pi - \theta^{D,T}_{pq,m_n},$$

$$\theta^{U,T}_{pq,m_n} = \pi - \theta^{D,R}_{pq,m_n}.$$

5. The method of generating parameters for the uplink and downlink asymmetric channel model according to claim 4, wherein Step 4 specifically includes following steps:

Step 401, calculating, by considering the antenna patterns of the transmitting side and the receiving side of the uplink and downlink, a total power $$P^D_{pq,m_n}$$

of the m-th path within the n-th cluster of the downlink, wherein a calculation formula is as follows:

$$P^D_{pq,m_n} = \tilde{P}^D_{pq,m_n} F^{D,T}\left(\phi^{D,T}_{pq,m_n}, \theta^{D,T}_{pq,m_n}\right) F^{D,R}\left(\phi^{D,R}_{pq,m_n}, \theta^{D,R}_{pq,m_n}\right),$$

a formula for calculating a total power $$P^U_{pq,m_n}$$

of the m-th path within the n-th cluster of the uplink is as follows:

$$P^U_{pq,m_n} = P^U_{pq,m_n} F^{U,T}\left(\phi^{U,T}_{pq,m_n}, \theta^{U,T}_{pq,m_n}\right) F^{U,R}\left(\phi^{U,R}_{pq,m_n}, \theta^{U,R}_{pq,m_n}\right),$$

a formula for calculating a total power $$P^D_{pq,n}$$

of each cluster of the downlink is as follows:

$$P^D_{pq,n} = \left\| \sum_{m=1}^{M_n} P^D_{pq,m_n} \exp\left(-j2\pi f \tau^D_{pq,m_n}\right) \right\|,$$

a formula for calculating a total power $$P^U_{pq,n}$$

of each cluster of the uplink is as follows:

$$P^U_{pq,n} = \left\| \sum_{m=1}^{M_n} P^U_{pq,m_n} \exp\left(-j2\pi f \tau^U_{pq,m_n}\right) \right\|,$$

comparing calculated cluster powers with an average noise power, clusters with cluster powers greater than the average noise power are effective clusters, and clusters with cluster powers less than the average noise power are ignored, to obtain an eventual set of all of the effective clusters.

6. The method of generating parameters for the uplink and downlink asymmetric channel model according to claim 5, the eventual channel impulse responses of the downlink in Step 5 are calculated as follows:

$$H^D_{p,q} = \sum_{n=1}^{N} \sum_{m=1}^{M_N} P^D_{pq,m_n} \exp\left(-j2\pi f \tau^D_{pq,m_n}\right) \delta\left(\tau - \tau^D_{pq,m_n}\right),$$

the channel impulse responses of the uplink are as follows:

$$H^U_{p,q} = \sum_{n=1}^{N} \sum_{m=1}^{M_n} P^U_{pq,m_n} \exp\left(-j2\pi f \tau^U_{pq,m_n}\right) \delta\left(\tau - \tau^U_{pq,m_n}\right).$$

* * * * *